United States Patent [19]

Phillips et al.

[11] Patent Number: 4,510,117

[45] Date of Patent: Apr. 9, 1985

[54] APPARATUS FOR IN SITU DETERMINATION OF BURNUP, COOLING TIME AND FISSILE CONTENT OF AN IRRADIATED NUCLEAR FUEL ASSEMBLY IN A FUEL STORAGE POND

[75] Inventors: John R. Phillips; James K. Halbig; Howard O. Menlove; Shirley F. Klosterbuer, all of Los Alamos, N. Mex.

[73] Assignee: The United States of America as represented by the United States Department of Energy, Washington, D.C.

[21] Appl. No.: 465,419

[22] Filed: Feb. 10, 1983

[51] Int. Cl.³ .............................................. G21C 17/00
[52] U.S. Cl. .................................. 376/257; 376/254
[58] Field of Search ................. 376/254, 255, 257; 250/390–392, 358.1

[56] References Cited

U.S. PATENT DOCUMENTS 4,325,785 4/1982 Klotz et al. ...................... 376/257
4,335,466 6/1982 Lee .................................... 376/257

OTHER PUBLICATIONS

LA-9002-MS, "Neutron Measurement Techniques for the Nondestructive Analysis of Irradiated Fuel Assemblies", Phillips et al., (11/81).

LA-9438-MS, "Nondestructive Verification with Minimal Movement of Irradiated LWR Fuel Assemblies", Phillips et al., 10/82.

IEEE Trans. Nucl. Sci., NS-29, No. 1, 858-862, (2/82), Halbig et al.

*Primary Examiner*—Sal Cangialosi
*Attorney, Agent, or Firm*—William A. Eklund; Paul D. Gaetjens; Judson R. Hightower

[57] ABSTRACT

A detector head for in situ inspection of irradiated nuclear fuel assemblies submerged in a water-filled nuclear fuel storage pond. The detector head includes two parallel arms which extend from a housing and which are spaced apart so as to be positionable on opposite sides of a submerged fuel assembly. Each arm includes an ionization chamber and two fission chambers. One fission chamber in each arm is enclosed in a cadmium shield and the other fission chamber is unshielded. The ratio of the outputs of the shielded and unshielded fission chambers is used to determine the boron content of the pond water. Correcting for the boron content, the neutron flux and gamma ray intensity are then used to verify the declared exposure, cooling time and fissile material content of the irradiated fuel assembly.

7 Claims, 6 Drawing Figures

APPARATUS FOR IN SITU DETERMINATION OF BURNUP, COOLING TIME AND FISSILE CONTENT OF AN IRRADIATED NUCLEAR FUEL ASSEMBLY IN A FUEL STORAGE POND

This invention is the result of a contract with the Department of Energy (Contract No. W-7405-ENG-36).

BACKGROUND OF THE INVENTION

The invention disclosed herein is generally related to radiation measuring instruments and methods. More particularly, this invention is related to apparatus for measuring the radiation emitted from spent nuclear fuel assemblies for the purpose of determining the burnup, or extent of consumption, and the related fissile content of the nuclear fuel contained therein.

The problem to which the present invention is directed is the in situ inspection of spent nuclear reactor fuel that is stored underwater in fuel storage ponds. Such inspection is an important element of the international effort to prevent wrongful diversion of special nuclear material that could be utilized to make nuclear weapons. There has not previously been available a simple yet efficient device for conducting quick on-site inspections to verify the operator-declared burnup and relate fissile content of spent fuel in storage.

Nuclear reactor fuel consists essentially of uranium which has been enriched in the fissile uranium isotope $U^{235}$. The fuel is ordinarily contained in what are referred to as nuclear fuel assemblies. Such fuel assemblies are the basic fuel units that are loaded into a reactor core and subsequently removed at a later date when the fissile material has been consumed to a level at which it is no longer practical to extract additional energy. Each fuel assembly consists of a bundle of spaced-apart, parallel fuel rods, which are metal tubes loaded with the nuclear fuel.

As the nuclear fuel is "burned" in the reactor, the fissile $U^{235}$ is progressively consumed by the induced fission process. However, not all of the fissile $U^{235}$ is consumed during the period the fuel assembly is in the reactor. Induced fission effectively ceases when the assembly is removed from the reactor, so that there remains some unburned $U^{235}$ in the spent fuel that is removed from the reactor. Additionally, the fission process produces other fissile materials, primarily plutonium-239, which accumulate in the fuel and remain there once the fuel assembly is removed from the reactor. Both $U^{235}$ and $Pu^{239}$ are special nuclear materials that must be safeguarded and accounted for after the spent fuel is removed from the reactor.

Since the induced fission process effectively stops when the spent fuel is removed from the reactor, the concentrations of $U^{235}$ and $Pu^{239}$ remain substantially constant thereafter. These isotopes gradually decay by spontaneous fission and alpha decay, but the rate of this decay is so slow as to be negligible for all practical purposes.

The extent of consumption of the $U^{235}$ originally present in the fuel is called the "burnup" of the fuel. The actual burnup of the spent fuel taken from a given fuel assembly is a function primarily of the power level at which the reactor was operated, integrated over the period of time the assembly was in the reactor. Accordingly, the burnup of the irradiated fuel, also called the exposure of the fuel, is ordinarily given in units of megawatt-days per metric ton of uranium metal, or MWd/tU. Burnup is also frequently given in units of gigawatt-days per metric ton, or GWd/tU. In a typical commercial power reactor a fuel assembly is subjected to an exposure on the order of 40,000 MWd/tU, or 40 GWd/tU.

In addition to the fissile materials in the irradiated fuel, there are large amounts of radioactive nonfissile fission products, which are byproducts of the fission process. These fission products include a host of radioactive nuclides which decay at various decay rates. Some of the fission products produce high levels of radiation, and it is for this reason that the spent fuel assemblies must be stored in a shielded and isolated environment for years after they are removed from a reactor core. This is normally done by storing the spent fuel assemblies underwater in specially designed storage ponds.

The radioactive fission products can be chemically separated from the relatively smaller amounts of fissile materials by established reprocessing methods. The fissile materials separated and concentrated by such reprocessing are relatively less radioactive than the fission products, and can be safely handled, stored and safeguarded. However, reprocessing of commercial fuel has not been implemented on a large scale because of concern that small amounts of the purified fissile materials might be wrongfully diverted without detection during the reprocessing of large amounts of fuel. As a result, large amounts of spent nuclear fuel have accumulated in storage ponds around the world, and will continue to accumulate in the forseeable future. The presence of this accumulated fuel presents a danger, however, because reprocessing of limited amounts of spent fuel, by a sophisticated entity having access to the fuel, could theoretically be carried out on a relatively small scale for the purpose of obtaining sufficient fissile material to fabricate nuclear weapons.

Accordingly, international agreements have been entered into, under which it is the task of the International Atomic Energy Agency to periodically inspect spent fuel assemblies at storage sites around the world for the purpose of verifying that the stored fuel has not been altered or tampered with. It is intended that such inspection will deter any attempt to wrongfully divert the spent fuel or its fissile contents, or at least to provide prompt detection of any such diversion that may be accomplished. More specifically, it is the object of such inspection to directly verify the fissile material content of the spent fuel in storage.

Since there may be hundreds of fuel assemblies submerged in a fuel storage pond, and many such ponds to be inspected, it has been sought to provide a method and apparatus for conducting rapid yet accurate analyses of spent fuel assemblies while they are underwater.

Gamma ray analysis of irradiated fuel assemblies has been considered as a simple way to inspect such assemblies. This may be accomplished by immersing a conventional gamma ray ionization chamber, for example, in a fuel pond and taking a reading from a position adjacent to a fuel assembly. A closely related method which has been employed is to measure the Cerenkov light emitted from the water around a fuel assembly, which is generated by gamma radiation from the assembly. However, the latter method must sometimes be conducted in the dark, thereby requiring the inspector to operate in an awkward and possibly unsafe manner. More importantly, however, gamma measurements alone cannot unequivocally distinguish radioactive fission products containing fissile materials from fission products from which the fissile materials have been removed, or from radioactive activation products that may have been substituted for the irradiated fuel.

Passive neutron analysis of spent fuel assemblies is one approach to this problem, since it may be utilized in a nondestructive in situ method which provides a reliable determination of the fissile content of spent fuel assemblies. This approach is complicated, however, by the fact that some storage ponds contain dissolved boron salts to absorb neutrons emitted from the fuel. More specifically, storage ponds of pressurized water reactors ordinarily contain boron at varying concentrations, whereas storage ponds associated with boiling water reactors do not contain boron.

SUMMARY OF THE INVENTION

Accordingly, it is the object and purpose of the present invention to provide an apparatus for verifying the burnup and determining fissile content of a spent nuclear fuel assembly.

It is also an object and purpose of the invention to provide an apparatus for determining in situ the fissile content of a spent nuclear fuel assembly in a fuel storage pond.

It is another object of the invention to provide a method and apparatus for determining the fissile content of a spent nuclear fuel assembly in situ in a storage pond that may or may not contain boron.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention as embodied and broadly described herein, the present invention provides a passive neutron and gamma-ray measuring apparatus that comprises an immersible detector head having two detector arms. The detector arms extend from a common base and are spaced apart so that they may be positioned on opposite sides of a submerged fuel assembly. The detector head is suspended from a rigid pipe to allow positioning under 20 to 30 feet of water in a storage pond.

Each detector arm includes an ionization chamber for detecting and measuring gross gamma radiation, and two fission chambers for detecting and measuring thermal and epicadmium neutrons. The ionization chamber and one of the fission chambers in each detector arm are enclosed in a neutron moderating substance, preferably polyethylene, which is in turn enclosed in a cadmium sheath. The second fission chamber in each detector arm is enclosed in the protective outer shell of the detector arm, but is otherwise unshielded. The latter fission chamber therefore detects only thermal neutrons. The cadmium-shielded fission chamber detects higher energy neutrons, commonly referred to as epi-cadmium neutrons.

The neutron measurements are used to verify the operator-declared exposure value. The gamma measurements are used to verify the cooling time of the assembly.

These and other aspects of the present invention will be apparent to one of ordinary skill in the art upon consideration of the more detailed description of the invention set forth below.

DETAILED DESCRIPTION OF THE PREFERRED EMBODIMENT

Figure 1:
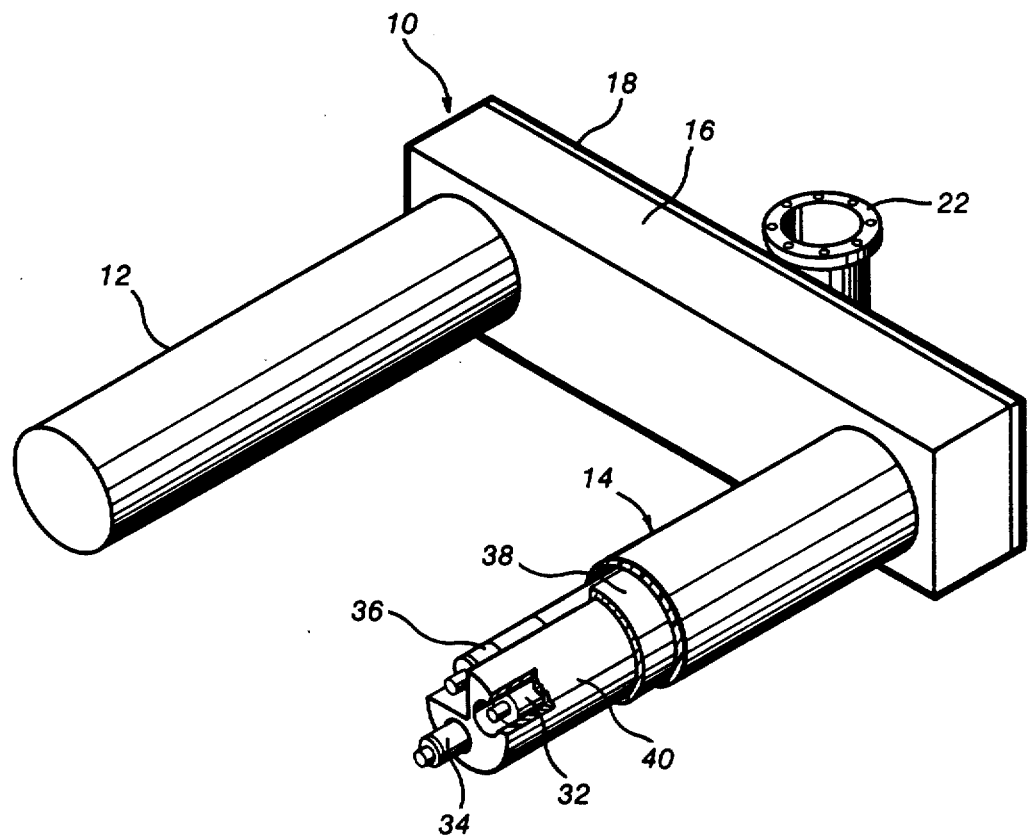
FIG. 1 is an isometric view of the preferred embodiment of the forked detector head of the apparatus of the present invention, with internal details of one arm of the detector illustrated in break-away fashion.
Figure 2:
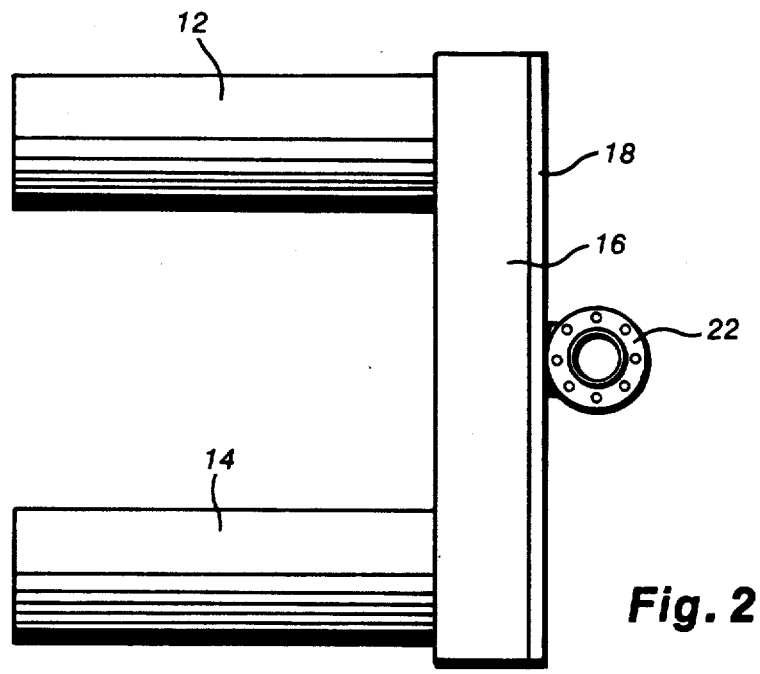
FIG. 2 is top plan view of the detector head of FIG. 1.
Figure 3:
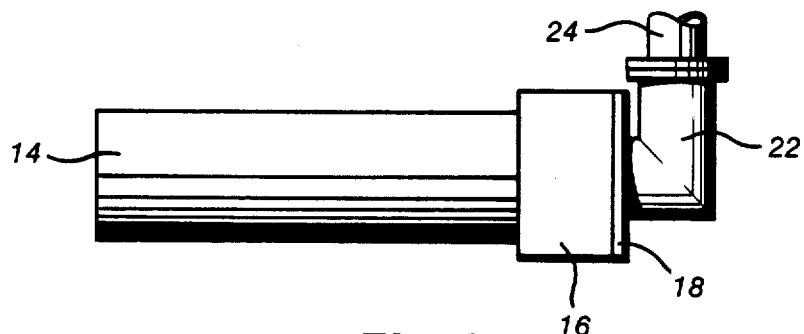
FIG. 3 is a side elevation view of the detector head of FIG. 1.

Neutrons emitted from irradiated nuclear fuel originate primarily from three sources: (1) spontaneous fission of actinide elements; (2) interaction of alpha particles from radioactive decay with light materials, oxygen-18 in particular; and (3) induced fission in the fissile material from the first two sources.

The curium isotopes $Cm^{242}$ and $Cm^{244}$ are the dominant sources of neutrons in irradiated fuel having an exposure greater than approximately 10 GWd/tU. These isotopes are produced by different neutron capture chains which each derive from $Pu^{241}$. The half lives of these isotopes are 0.446 years ($Cm^{242}$) and 18.1 years ($Cm^{244}$). Thus, after a few years virtually all of the neutron flux is due to $Cm^{244}$.

The plutonium isotopes can contribute a significant proportion of the total neutrons emitted from irradiated fuel having relatively low exposures ($<10$ GWd/tU) or irradiated fuel having extremely long cooling times ($>100$ years). The uranium isotopes are significant only in fuel assemblies which have not been irradiated.

The neutron and gamma-ray signatures of the uranium and plutonium isotopes in irradiated fuel cannot be measured directly because they are overwhelmed by the radiation from other actinides and fission products. Therefore, the concentration of these isotopes in irradiated fuel must be determined indirectly by relating the accumulation of specific fission products to the consumption of the $U^{235}$ and the accumulation of plutonium. A combination of gamma ray and neutron measurements is considered to be the most cost-effective and practical method, considering the quality of the information collected and the time required for the measurements. These two types of measurements may be obtained simultaneously and utilized in the manner described below to verify the fissile content of the fuel.

The gross gamma ray intensity is used to calculate the consistency of the operator-declared cooling times. This is done by dividing the gross gamma ray intensity by the exposure value for the fuel, determined from the passive neutron measurements discussed below, to give a plot which decreases exponentially with the cooling time. The fission and activation products in the irradiated fuel are the principal sources of gamma radiation. Because of the complicated production chains, different half-lives, and different fission yields, it is very difficult to relate the gross gamma ray intensity to operator-declared exposures. It is for this reason that the gross gamma measurement is taken in combination with a measurement of the total neutron emission, which varies as a power function of the exposure and therefore can be used to calculate the exposure.

Ignoring for the moment the effects of boron in the pond water, the total neutron emission rate from irradiated fuel varies as a power function of the exposure value, and is also directly related to the total amount of fissile material in the irradiated fuel. More specifically, it has been determined that the neutron emission rates of actinides in fuel material are directly related to the burnup by a power functional relationship represented by the equation:

$$\text{Count rate} = (\alpha)(\text{burnup})^\beta,$$

where $\alpha$ is a scaling factor and $\beta$ is a constant between 2.0 and 4.0, depending on the particular type of fuel material.

Passive neutron measurements can determine rapidly the relative exposures of irradiated fuel assemblies with an average absolute difference of approximately 4%, using the power function stated to above.

Referring to FIGS. 1 through 5, the preferred embodiment of the present invention consists of a fork-shaped detector head 10, including a pair of substantially identical detector arms 12 and 14 which extend horizontally and in parallel from the opposite ends of a rectangular hollow housing 16. The housing 16 has an access opening on its back side, which is ordinarily closed by means of a closure plate 18 sealed with an elastomeric O-ring 20. An elbow tube 22 connected to the back of the closure plate 18 enables the detector head 10 to be connected to a rigid stainless steel pipe 24 (shown in FIG. 6), which is used to lower the detector head into a storage pond and position it as required, with the associated electrical wiring being passed through the pipe 24.

The detector arms 12 and 14 and the housing 16 are formed from a single piece of high-density polyethylene plastic, which is milled to the appropriate shape. Such an integral construction is preferred in order to minimize the possibility of leaks and in order to facilitate thorough cleaning of the detector head of radioactively contaminated water after use at an inspection site. Each arm has a diameter of about three inches.

Each detector arm 12 and 14 is cylindrical in shape and is hollow, being closed at its outer end and opening at its rear end into the hollow housing 16. The detector assemblies contained in each arm are substantially identical and are described further below with respect to the illustrated arm 14.

Figure 4:
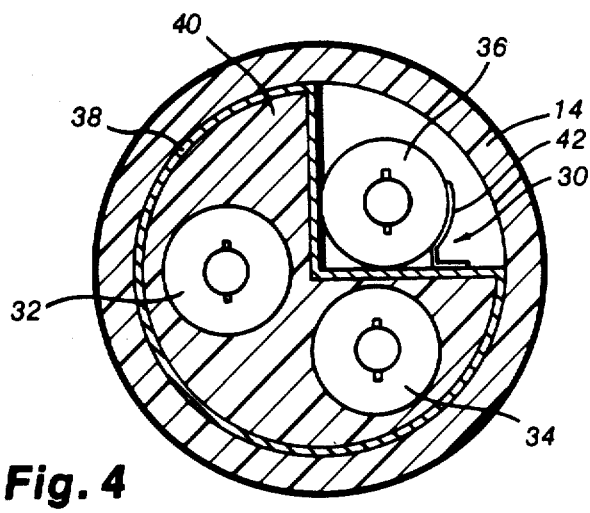
FIG. 4 is a cross-sectional end view of one detector arm assembly.

Referring particularly to FIGS. 1 and 4, the detector arm 14 contains a detector assembly 30 which includes an ionization chamber 32, a shielded fission chamber 34 and an unshielded fission chamber 36. The entire detector assembly is removable and is inserted into the bore of the arm 14 through its opening into the housing 16.

The detector assembly 30 further includes a cadmium shield 38 and a high-density polyethylene insert 40. The insert 40 is generally cylindrical in shape, but with a one-quarter section removed. The cadmium shield is sized and shaped to fit closely around the polyethylene insert and to be inserted with a close fit into the bore of the hollow arm 14.

The ionization chamber 32 and the shielded fission chamber 34 are inserted into cylindrical bores in the insert 40. The unshielded fission chamber 36 is positioned in the quarter-section corner grove of the insert 40 such that it is outside the cadmium shield 38 yet inside the bore of the arm 14. The unshielded fission chamber is held in place with a fastener 42.

Figure 5:
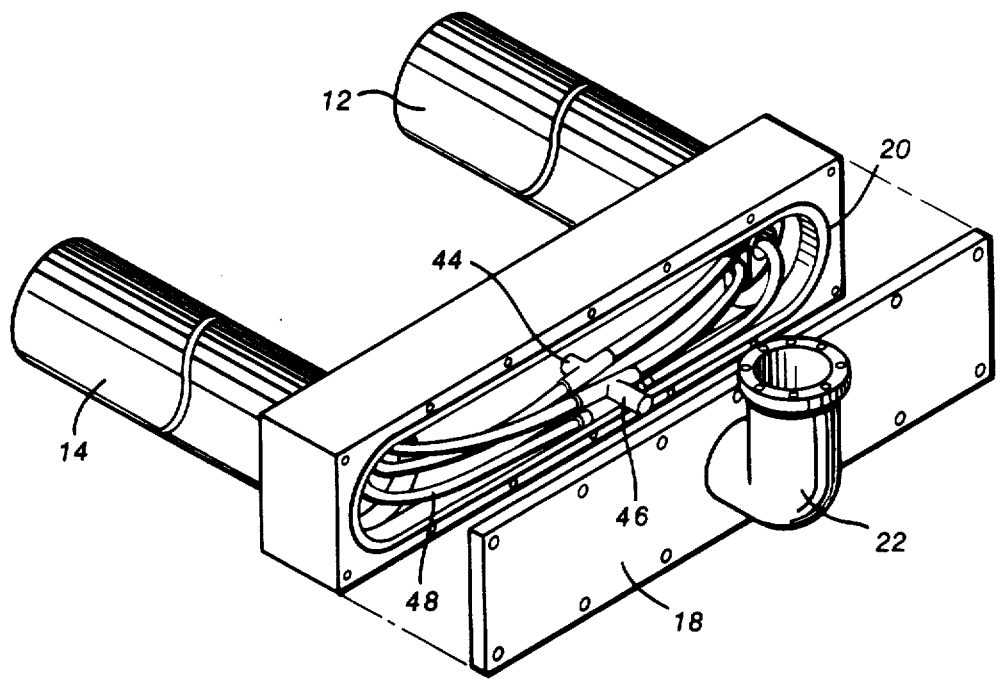
FIG. 5 is an exploded isometric rear view of the detector head of FIG. 1.
Figure 6:
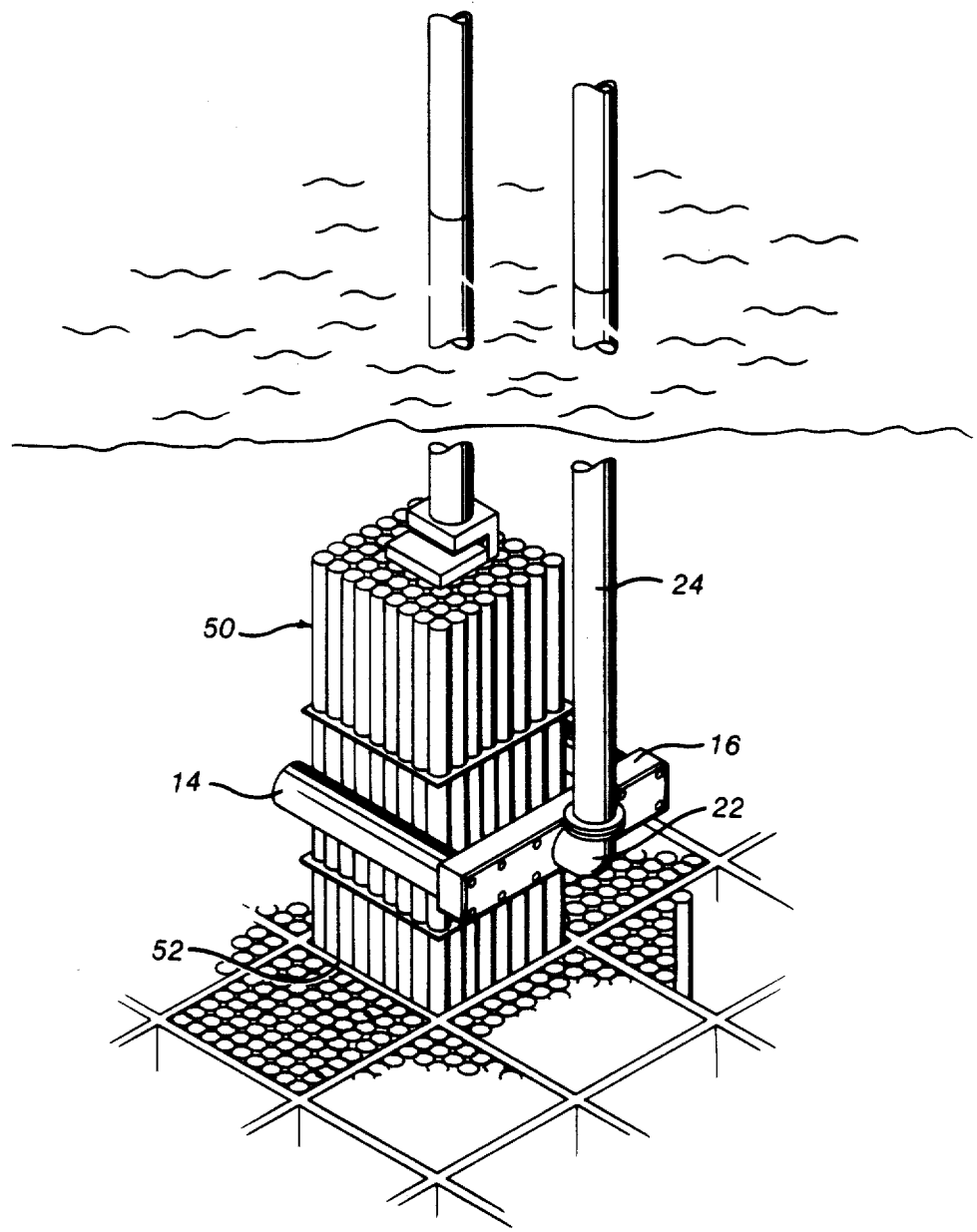
FIG. 6 is a pictorial view of the detector head as it may be positioned underwater in a fuel storage pond to inspect an irradiated nuclear fuel assembly.

The fission chambers and the ionization chambers include electrical leads which pass through the housing 16 and up the support pipe 24. The output leads of the shielded fission chambers are combined in a T-joint 44 located in the housing 16, and the output leads of the unshielded fission chambers are likewise combined in a T-joint 46. Output leads 48 from the ionization chambers 32 are also illustrated in FIG. 5.

The shielded and unshielded fission chambers in each detector arm are located so as to extend parallel to one another and, further, such that they lie in a common vertical plane. This orientation is employed so that the two types of fission chambers have substantially identical geometric orientations with respect to a fuel assembly, and are also located at the same distance from a fuel assembly.

Two detector assemblies are used in the preferred embodiment for two reasons. First, a single detector assembly is capable of obtaining reproducible results only to within about 6%, whereas two detector assemblies oriented in the fork detector head design are capable of obtaining reproducible results to within about 4%. Secondly, it is not uncommon for fuel assemblies to have uneven exposures due to the positioning of the assembly in the reactor core. Hence, the use of two detector assemblies on opposite sides of the fuel assembly gives an average value that is both reproducible and more representative of the average exposure of the fuel within the assembly.

It has been considered to use a detector head having two detector assemblies oriented at right angles to one another, such that the detector head may simply be placed against one corner of a fuel assembly, and such that the two detector assemblies detect radiation emitted from adjacent sides of the assembly. However, the forked detector head is preferred over such a design because in some reactors, particularly boiling water reactors, there are cruciform neutron moderating structures which result in uneven exposure of adjacent sides of some fuel assemblies. With a corner detector head, such unevenly exposed fuel assemblies could give different measurements depending on which faces of the assembly the detector head is placed against, whereas with the forked design consistent measurements are obtained regardless of how the detector head is engaged with the fuel assembly.

The ionization chamber measures gross gamma radiation, that is, total gamma radiation over a broad spectrum of energies. The ionization chamber is insensitive to neutrons. Any of several types of commercially available ionization chambers may be utilized. The chambers are operated in a current mode, as opposed to a pulse counting mode, in order to obtain suitable measurements under the conditions of very intense gamma radiation.

The neutron detectors are preferably $U^{235}$ fission chambers, which are sensitive to thermal neutrons but are relatively insensitive to gamma radiation. As will be appreciated by one of ordinary skill in the art, such detectors consist of a hollow ionization chamber, the inside surface of which is lined with a thin layer of $U^{235}$.

The impingement of thermal neutrons on the $U^{235}$ induces fission in the $U^{235}$. Such fission results in the release of heavy fission products as well as alpha, beta and gamma radiation, all of which result in ionization which is detected to provide a measurement of the thermal neutron flux.

As discussed further below, the cadmium-shielded fission chambers are primarily responsive to high energy neutrons. Such neutrons pass through the cadmium shielding, which has a high capture cross-section for low-energy neutrons but a low cross-section for high energy neutrons. However, the high-energy neutrons passing through the cadmium shielding must be thermalized in order to be effectively detected by the shielded fission chamber, and it is for this reason that the cadmium-shielded fission chambers are enclosed in polyethylene inside the cadmium shielding.

Boron is a thermal neutron absorber. Hence, its presence in the water around a fuel assembly affects the output of the unshielded fission chamber more than the output of the cadmium-shielded fission chamber. The cadmium-shielded fission chamber is responsive primarily to high energy neutrons, which are called epi-cadmium neutrons, and which are not significantly affected by boron in the water. Thermal, or low-energy neutrons are absorbed by the cadmium, as well as any boron in the water, such that the cadmium-shielded fission chamber is largely insensitive to changes in the boron content of the water, whereas the unshielded fission detector, which is responsive primarily to thermal neutrons, is sensitive to variations in the boron content of the water. The ratio of the outputs of the two types of fission chambers thus provides a basis for determining the boron concentration in the fuel pond. In practice, the ratio of the combined outputs of both bare fission chambers to the combined outputs of both cadmium-housed fission chambers is used to obtain the boron content of the water.

The outputs of the two unshielded fission chambers are combined, and the outputs of the two cadmium-shielded fission chambers are likewise combined.

In operation, a nuclear fuel assembly 50 (FIG. 6) is raised upwardly until it is at least partially removed from its protective box enclosure 52 but still submerged at a safe depth in the fuel pond. The detector head is then lowered into the water, ordinarily to a depth on the order of 25 to 30 feet, and the detector arms are placed in position on opposite sides of the fuel assembly. These operations are conducted using the fuel-handling device and the movable refueling bridge which are available at all fuel storage ponds. It will be noted that the fork design of the detector head allows the detector to be placed in position without having to remove the fuel assembly from the pond or even from the vertical box enclosure in which the assembly is ordinarily stored. This results in less interruption of the normal operations of the reactor facility during inspection.

The outputs of both pairs of fission chambers need only be measured once, on the first measurement, for the purpose of determining the boron content of the water. Once the boron content has been determined from the ratio of the two outputs, only the output of one fission chamber need be measured for all subsequent fuel assemblies in the pond, with correction for the boron content being made in each case. The measurement time for a single fuel assembly is typically 30 to 200 seconds, depending on the neutron activity.

The detector head may be raised and lowered along the fuel assembly if it is desired to obtain spot or continuous checks of the integrity of a fuel assembly. Alternatively, the detector head may be held in a fixed position while the fuel assembly is raised or lowered as required. Ordinarily a single midpoint measurement will be sufficient to inspect a fuel assembly and verify its fissile material content, with spot checks along the length of selected fuel assemblies for the purpose of verifying the integrity of the assemblies.

The foregoing description of the preferred embodiment of the invention has been presented for purposes of illustration and description. It is not intended to be exhaustive or to limit the invention to the precise form disclosed, and various modifications and substitutions may be made without departing from the essential scope of the invention. The preferred embodiment was chosen and described in order to best explain the principles of the invention and its practical application to thereby enable others skilled in the art to best utilize the invention in various applications and with various modifications as are suited to the particular use contemplated. It is intended that the scope of the invention be defined by the claims appended hereto.

We claim:

1. A detector head for determining the exposure, cooling time and fissile content of an irradiated nuclear fuel assembly submerged in a spent-fuel storage pond, comprising two spaced apart parallel detector arms extending from a housing, each detector arm including two fission chambers for detecting passive neutrons and an ionization chamber for detecting gross gamma radiation, one of the fission chambers in each detector arm being shielded by a cadmium shield such that the ratios of the outputs of the shielded and unshielded fission chambers can be utilized to determine and compensate for the presence of boron in the water of the storage pond, and whereby the outputs of the fission and ionization chambers can be utilized to verify the declared exposure, fissile content, and cooling time of the fuel assembly.

2. The apparatus defined in claim 1 wherein said fission chambers are $U^{235}$ fission chambers.

3. The apparatus defined in claim 2 wherein said shielded fission chambers are enclosed inside a neutron moderating material which is located inside said cadmium shield.

4. The apparatus defined in claim 1 wherein each of said detector arms comprises a hollow high density polyethylene tube, and wherein each of said tubes containing a high density polyethylene insert having a generally cylindrical shape with a quarter-section removed, said cadmium shield comprising a sheet of cadmium conformably enclosing said insert, said shielded fission chamber being located in a bore in said insert and said unshielded fission chamber being located outside said cadmium shielding in the quarter-section corner of said insert.

5. The apparatus defined in claim 4 wherein said shielded and unshielded fission chambers are parallel to one another and lie in a common vertical plane, whereby said fission detectors are oriented in substantially identical orientations with respect to a fuel assembly, and at identical distances from a fuel assembly.

6. The apparatus defined in claim 5 wherein said ionization chamber is located in a bore in said insert and extends parallel to said fission chambers.

7. The apparatus defined in claim 5 wherein the outputs of said shielded fission chambers are combined to provide a single output signal and wherein the outputs of said unshielded fission chambers are also combined to provide a single output signal.

* * * * *